United States Patent
Rub (10) Patent No.: US 8,576,507 B2
(45) Date of Patent: Nov. 5, 2013

(54) DISC DRIVE DATA RECOVERY UTILIZING OFF CENTER TRACK INFORMATION

(75) Inventor: Bernardo Rub, Sudbury, MA (US)

(73) Assignee: Seagate Technology LLC, Cupertino, CA (US)

( * ) Notice: Subject to any disclaimer, the term of this patent is extended or adjusted under 35 U.S.C. 154(b) by 959 days.

(21) Appl. No.: 12/692,247

(22) Filed: Jan. 22, 2010

(65) Prior Publication Data

US 2011/0181978 A1 Jul. 28, 2011

(51) Int. Cl.
*G11B 5/02* (2006.01)

(52) U.S. Cl.
USPC .......................................................... 360/55

(58) Field of Classification Search
USPC ................ 360/77.04, 31, 77.02, 66, 75, 55; 369/44.25, 44.29, 53.15
See application file for complete search history.

(56) References Cited

U.S. PATENT DOCUMENTS

| | | | |
|---|---|---|---|
| 5,867,343 A | 2/1999 | Le et al. | |
| 5,892,635 A * | 4/1999 | Morita | 360/77.02 |
| 6,078,454 A * | 6/2000 | Takahashi et al. | 360/66 |
| 6,600,621 B1 * | 7/2003 | Yarmchuk | 360/75 |
| 6,747,924 B1 * | 6/2004 | Muramatsu | 369/44.29 |
| 6,836,453 B2 | 12/2004 | Fukushima | |
| 6,862,151 B2 | 3/2005 | Hoskins et al. | |
| 7,002,769 B2 * | 2/2006 | Kagami et al. | 360/77.02 |
| 7,088,535 B2 | 8/2006 | Kim et al. | |
| 7,206,990 B2 | 4/2007 | Su et al. | |
| 7,259,314 B2 * | 8/2007 | Kobayashi et al. | 84/604 |
| 7,372,658 B2 * | 5/2008 | Takaishi | 360/77.04 |
| 7,602,576 B2 | 10/2009 | Yoshida | |
| 7,715,288 B2 * | 5/2010 | Nakane | 369/44.25 |
| 7,875,866 B2 * | 1/2011 | Kitahara et al. | 250/492.2 |
| 7,961,777 B2 * | 6/2011 | Nakanishi et al. | 375/224 |
| 8,031,421 B2 * | 10/2011 | Shitara et al. | 360/31 |
| 8,120,871 B1 * | 2/2012 | Sutardja et al. | 360/77.04 |
| 2002/0131187 A1 * | 9/2002 | Komine | 360/31 |
| 2008/0151716 A1 * | 6/2008 | Tatsuzawa et al. | 369/53.15 |

* cited by examiner

*Primary Examiner* — Fred Tzeng
(74) *Attorney, Agent, or Firm* — Alan G. Rego; Westman, Champlin & Koehler, P.A.

(57) ABSTRACT

Disc drive data recovery methods and systems that utilize off center track information are provided. A disc drive data track is illustratively read at a first position along a width of the data track and at a second position along the width of the data track. The data read from the track is stored and tagged with indications of the first and the second positions. The tagged data is optionally used to calculate average waveforms for each of the first and the second positions and to identify the average waveform having the highest signal-to-noise ratio.

20 Claims, 8 Drawing Sheets

DISC DRIVE DATA RECOVERY UTILIZING OFF CENTER TRACK INFORMATION

BACKGROUND

Disc drives commonly store data to magnetic recording media and later read the data from the media using magnetoresistive transducers. Occasionally, disc drives may have difficulty in reading back data written to media. For instance, an adjacent data track may partially overlap a data track that is attempting to be read. This overlap, which is sometimes referred to as "encroachment," may cause a degradation in the signal trying to be read and/or cause in an increase in noise (i.e. it may cause a decrease in the signal-to-noise ratio). Accordingly, it may be difficult to recover the data stored in the track.

SUMMARY

An aspect of the disclosure relates to disc drive data recovery utilizing off center track information. In one illustrative method, a disc drive data track is read at a first position along a width of the data track and at a second position along the width of the data track. The data read from the track is stored and tagged with indications of the first and the second positions. The tagged data is optionally used to calculate average waveforms for each of the first and the second positions and to identify the average waveform having the highest signal-to-noise ratio.

These and various other features and advantages that characterize the claimed embodiments will become apparent upon reading the following detailed description and upon reviewing the associated drawings.

DETAILED DESCRIPTION

Embodiments of the present disclosure illustratively include systems and methods for recovering data written to recording media. In at least certain embodiments, waveforms having improved signal-to-noise ratios are able to be obtained. These waveforms may then be used to recover data that may have otherwise been unrecoverable. In one embodiment, a single data track is read multiple times at various position offsets along the width of the track. The waveform for each read is stored and is tagged with information indicative of its position along the width of the track. Waveforms having the same track position are averaged together to generate an average waveform. The average waveform illustratively has an improved signal-to-noise ratio by having removed random electronic noise that is included within each of the individual waveforms. Additionally, as will be discussed in greater detail below, the averaged waveforms for the various positions along the width of the track may be used to identify the waveform that most corresponds to the center of the track. In at least certain circumstances, this waveform has the highest signal-to-noise ratio and is utilized in recovering the data.

In another embodiment, signal-to-noise ratios are illustratively improved by actively cancelling or filtering noise components associated with adjacent data tracks. For instance, a waveform of a track taken along the center of the track illustratively has the least amount of interference from its adjacent tracks. Waveforms of the track taken at offsets from center of the track illustratively have greater interference from adjacent tracks. Accordingly, as will be described below, this information can be used to estimate the interference from adjacent tracks at the center of the track and to remove that estimated interference from the waveform at the track center. This may in at least some cases improve the signal-to-noise ratio and help recover data.

Before going into further details of embodiments of the present disclosure, it is worthwhile to first describe illustrative operating environments in which certain embodiments may be incorporated. Although certain embodiments may be incorporated in environments such as those shown in FIGS. 1, 2, 3, and 4, embodiments are not limited to any particular environment and are illustratively practiced in any number of environments.

Figure 1:
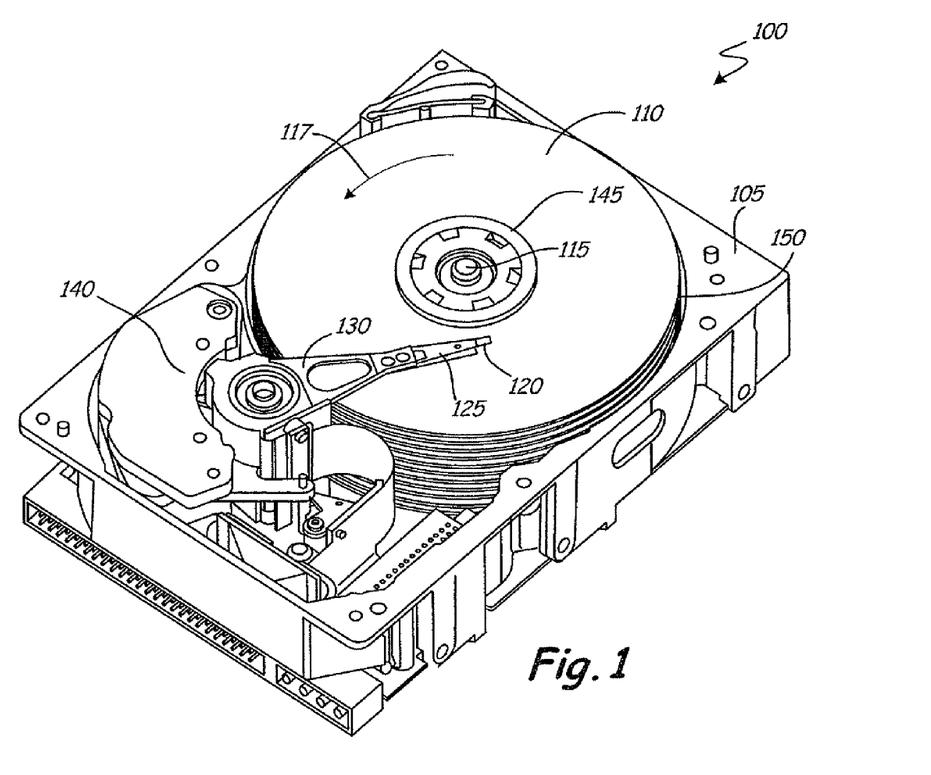
FIG. 1 is a perspective view of a data storage system.

FIG. 1 is a perspective view of a hard disc drive 100. Hard disc drives are a common type of data storage system. While embodiments of this disclosure are described in terms of disc drives, other types of data storage systems should be considered within the scope of the present disclosure. Disc drive 100 includes an enclosure 105. Disc drive 100 further includes a disc or recording medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in a path between a disc inner diameter 145 and a disc outer diameter 150. Medium 110 illustratively includes a number of concentric recording or data tracks between disc inner diameter 145 and disc outer diameter 150. These tracks are discussed in further detail below in connection with the description of FIG. 4.

Figure 2:
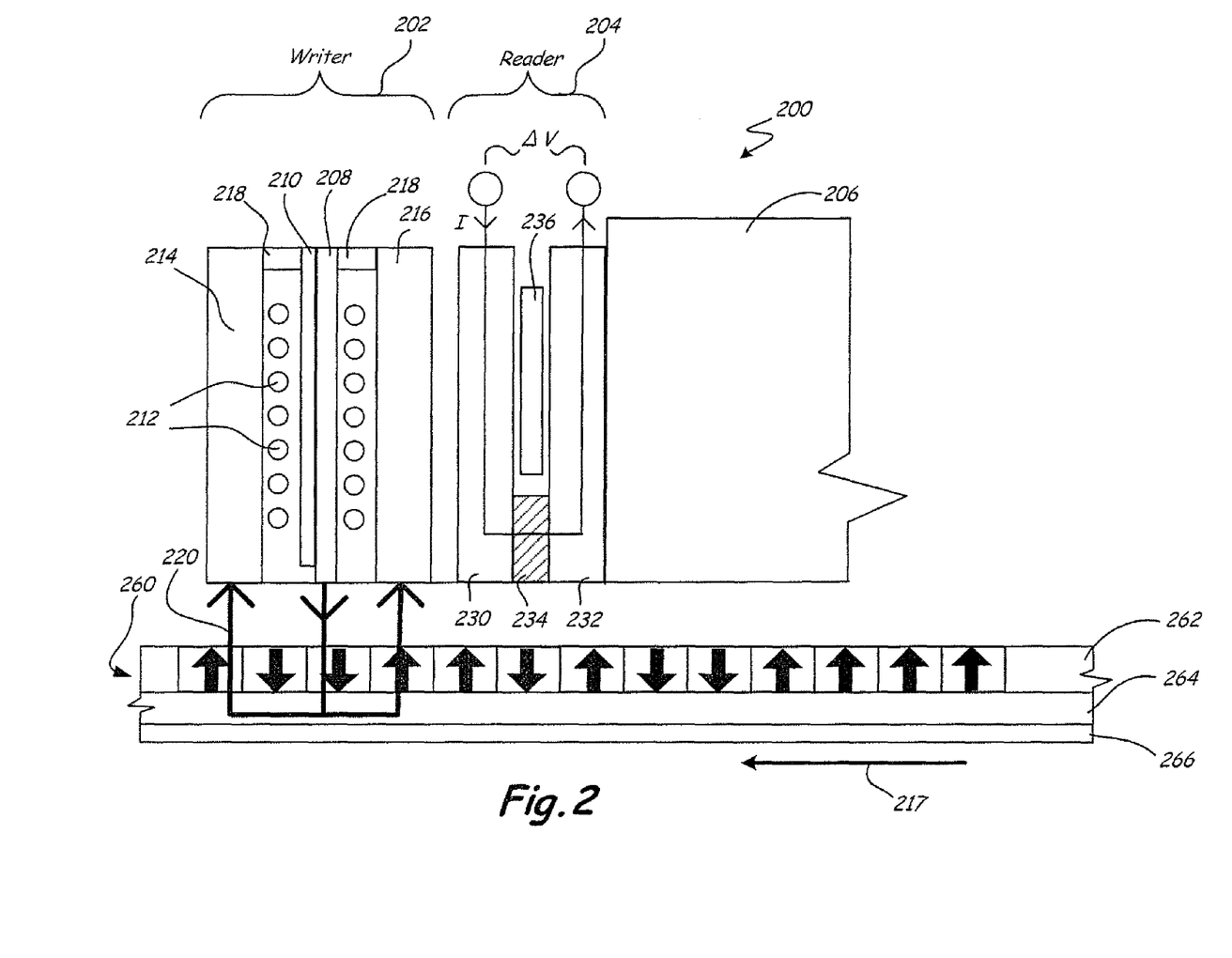
FIG. 2 is a schematic diagram of a cross-section of a recording head writing to a recording medium.

FIG. 2 is a schematic diagram of a cross-section of a recording head 200 writing to a recording medium 260. Recording head 200 is illustratively carried by a slider such as slider 120 in FIG. 1, and medium 260 is illustratively a storage medium such as medium 110 in FIG. 1. FIG. 2 is a simplified diagram only showing cross-sectional views of some components of a recording head. Those skilled in the art will recognize that recording heads commonly include other components such as, but not limited to, insulating materials and additional electrical connection points.

Head 200 includes a writing element 202, a reading element 204, and a main body 206. For simplification purposes, only a portion of main body 206 is shown in the figure. Those skilled in the art will recognize that main body 206 illustratively includes an air bearing surface that helps control the "fly height" or head-to-media spacing between head 200 and medium 260.

Writing element 202 includes a write pole 208, a yoke 210, magnetization coils 212, a first return pole 214, a second return pole 216, and a via 218. Recording medium 260 includes a recording layer 262, an underlayer 264, and a substrate 266. Recording layer 262 is illustratively a hard magnetic layer that is capable of storing a magnetization pattern, and underlayer 264 is illustratively a soft magnetic material that allows for magnetic flux to pass through. Arrow 217 is illustratively a direction of rotation such as arrow 117 in FIG. 1, and medium 260 optionally rotates in the direction shown by arrow 217.

In an embodiment, electric current is passed through coils 212 to generate magnetic flux 220. Flux 220 passes from write pole 208, through recording layer 262, into underlayer 264, and across to return poles 214 and 216. The polarity of magnetic flux 220 is illustratively reversed by reversing the polarity of the electric current passed through coils 212. Magnetic flux 220 illustratively records a magnetization pattern to recording layer 262. A magnetization pattern is represented by the up and down arrows shown in the figure.

Reading element 204 includes a top shield 230, a bottom shield 232, a transducer or magnetoresistive element 234, and a permanent magnet 236. An electrical current is illustratively passed from top shield 230, through magnetoresistive element 234, and back through bottom shield 232. The electrical resistance of magnetoresistive element 234 illustratively changes in response to the magnetic fields from the recording medium beneath it. Recording head 200 is able to determine the magnetization pattern in recording layer 262 by detecting the varying voltage differential across reading element 204. Top shield 230 and bottom shield 232 also act to control the magnetic field that reaches magnetoresistive element 234. For example, shields 230 and 232 reduce the effects of bits written to recording layer 262 that are adjacent to the bit that is intended to be read (i.e. the bit currently beneath magnetoresistive element 234).

Figure 3:
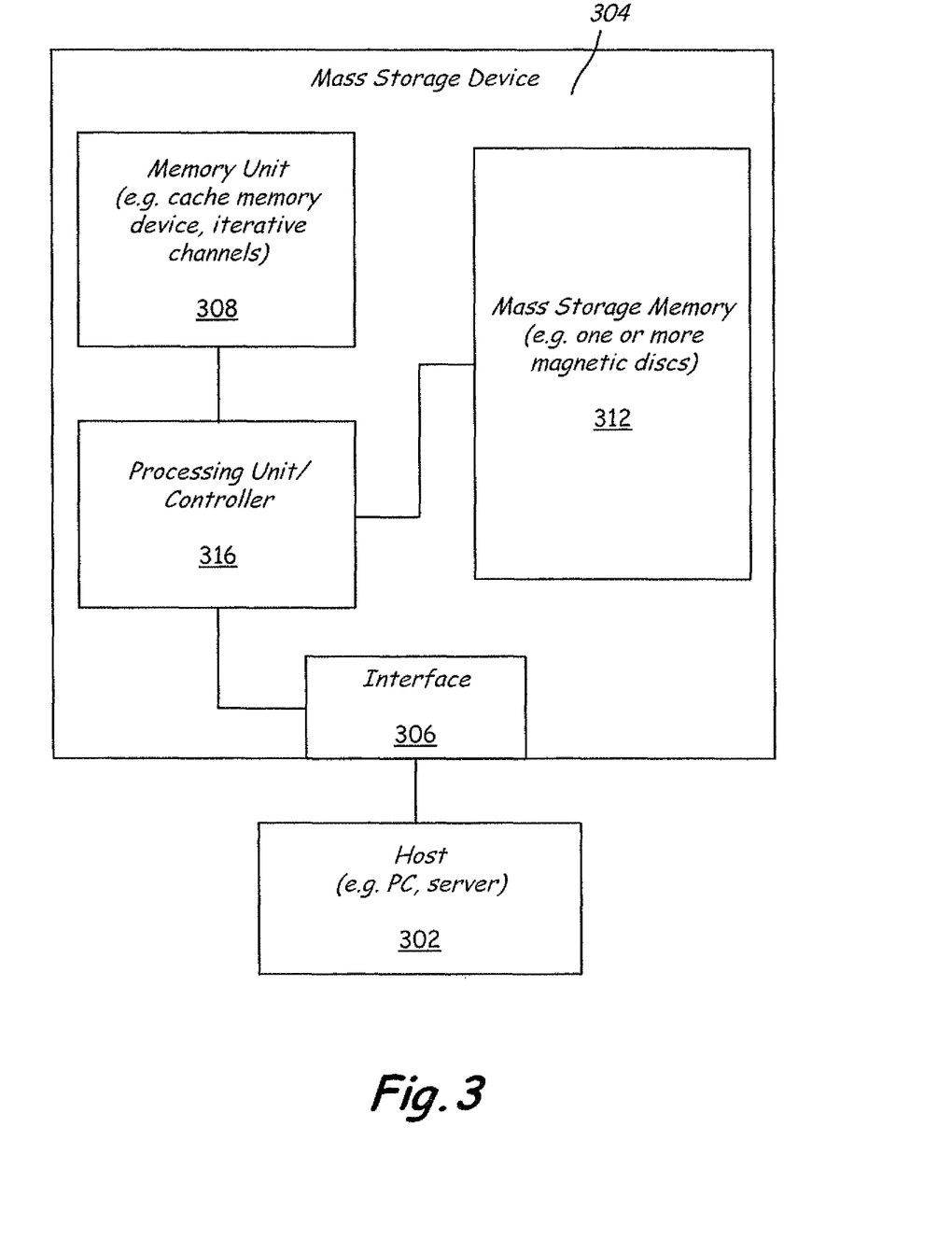
FIG. 3 is an electrical block diagram of a mass storage device communicatively coupled to a host.

FIG. 3 is a simplified electrical block diagram of a mass storage device 304 communicatively coupled to a host 302. Mass storage device 304 receives commands (e.g. read and write commands) from host 302 through an interface 306. Mass storage device 304 illustratively has a mass storage memory 312. In an embodiment, mass storage memory 312 includes a magnetic recording device having one or more recording media. Processing unit or controller 316 illustratively utilizes memory unit 308 to store digital samples of waveforms read from mass storage memory 312. Memory unit 308 may for instance store multiple digital images of a single data track included within memory 312. Processing unit 316 then illustratively utilizes the stored images in recovering the data stored in the track.

Figure 4:
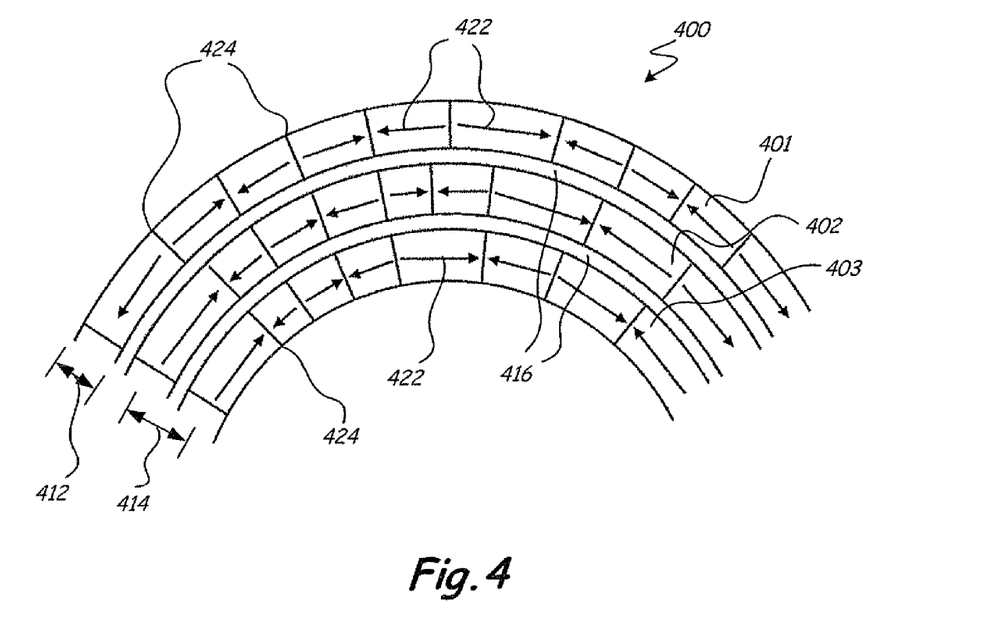
FIG. 4 is a schematic diagram of adjacent data tracks on a recording medium.

FIG. 4 is a simplified schematic drawing of adjacent data tracks 401, 402, and 403 on a recording medium 400. As those skilled in the art will recognize, recording media are not limited to having any particular number of concentric tracks between its inner and outer diameters. Medium 400 shown in FIG. 4 has been simplified for illustration purposes.

Each track has a width 412 that in certain embodiments is largely determined by the shape and configuration of the writing element used to record the track. Arrows 422 represent magnetic orientations of the tracks, and lines 424 represent transitions in which the magnetic orientation of the track switches. The tracks are spaced apart by a pitch 414 and are shown to have guard bands 416 separating the tracks. Embodiments are not however limited to any particular configuration and may not have guard bands. Additionally, due to positioning errors during the writing process or for other reasons, adjacent tracks may overlap or encroach each other, which as will be discussed below, can lead to difficulty in recovering data written to the encroached tracks. Further, embodiments of recording media illustratively have other features not shown in the figure. For example, for illustration purposes only and not by limitation, recording media may have position or timing marks that are used in the identification of positions within the recording media.

Figure 5:
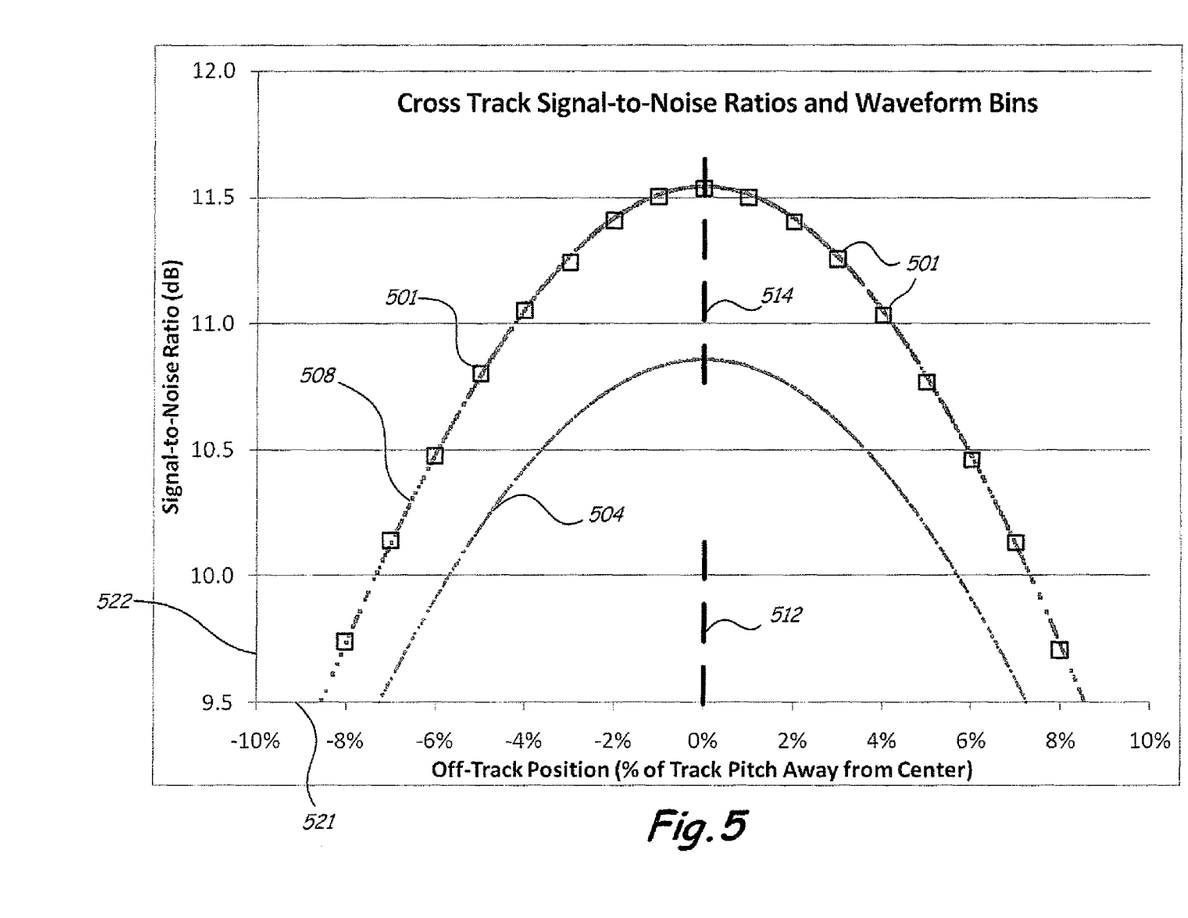
FIG. 5 is a graph of cross track signal-to-noise ratios and waveform bins.

FIG. 5 is a graph of one embodiment of cross track bins 501 according to the present disclosure. The graph shows illustrative signal-to-noise ratios for one instantaneous time or position along the length of a recording medium data track. The X-axis 521 corresponds to various positions across the width of the track. The 0% marker on X-axis 521 indicates the nominal read center (e.g. where the recording head is positioned during a standard playback process). The negative percentages indicate positions away from the nominal center in the negative direction, and the positive percentages indicate positions away from the nominal center in the positive direction. In the graph, the distances are represented as a percentage of the track pitch.

In FIG. 5, the Y-axis 522 corresponds to signal-to-noise ratios. At each position across the track, the reading element (e.g. a magnetoresistive transducer) detects both a signal that corresponds to the magnetic orientation written to the data track and also noise. There are many potential causes for noise. One cause of noise is interference from adjacent tracks. Adjacent track interference is illustratively lowest at the center of the track (i.e. the position furthest away from the adjacent tracks) and increases in going outward in any direction along the width of the track (i.e. adjacent track interference increases as the position becomes closer to the adjacent tracks). This phenomenon is illustrated in the example shown in FIG. 5. In FIG. 5, the signal-to-noise ratio illustratively decreases going outward from the center of the track in either direction.

FIG. 5 has two curves. The bottom curve 504 illustrates an example of signal-to-noise ratios across the recording track width that include electronic noise, and the top curve 508 illustrates an example of signal-to-noise ratios across the recording track width that do not include electronic noise. Electronic noise is commonly generated by various components within a hard disc drive (e.g. by a controller or preamp). In at least certain embodiments, electronic noise is random such that if multiple reads at the same track position are averaged together, the average track noise goes or tends to go to zero. This characteristic is illustratively utilized by some embodiments of the present disclosure to improve data recovery. One embodiment that utilizes the characteristic is shown in FIG. 6.

Figure 6:
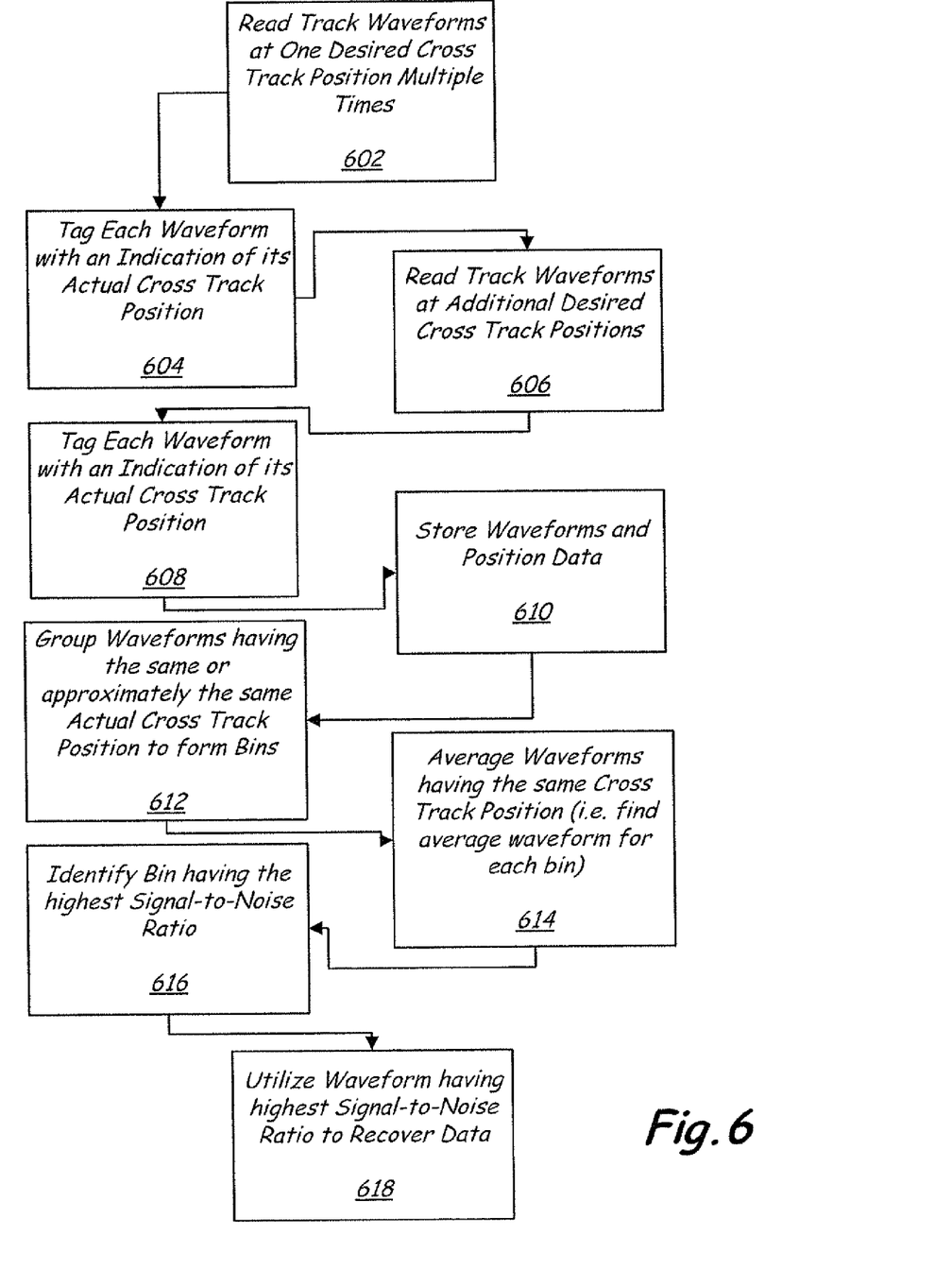
FIG. 6 is a flow diagram of a method of creating and utilizing waveform bins to recover data written to a data track.

FIG. 6 is a flow diagram of one method of creating and utilizing waveform bins for data recovery. At block 602, multiple track waveforms at one desired cross-track position are read. The waveforms are then tagged or associated with an indication of their actual cross-track position at block 604. Before continuing to describe the method, it is worthwhile to discuss the concepts of desired and actual positions.

Hard disc drives attempt to position recording heads at various positions relative to their associated recording media to read data stored on the media. It is common however that hard disc drives are not able to position their heads precisely where they intend to. Or, in other words, there is some positioning error between the desired head location (i.e. where the head is intended to be positioned) and the actual head location. The positioning error and actual location of a head are able to be identified by the servo systems included within hard disc drives for positioning their heads.

In light of the above discussion, at block 602 when multiple track waveforms are read at one desired cross-track position, the multiple waveforms have different actual cross-track positions. The waveforms for instance may form a distribution (e.g. a Gaussian distribution) about the intended cross-track position. These different actual positions or an indication of the actual positions are included within the information tagged to the waveforms at block 604.

At block 606, multiple track waveforms at additional desired cross-track positions are read. In the illustrative example shown in FIG. 5, multiple track waveforms are taken at each of 0%, +/−1%, +/−2%, +/−3%, +/−4%, +/−5%, +/−6%, and +/−7% relative to the track center. At block 608, the additional waveforms are tagged with their actual position data, and at block 610, the waveforms and their position data are stored. The data is illustratively stored in a waveform digital sample store (e.g. memory unit 308 in FIG. 3), in a mass storage memory (e.g. element 312 in FIG. 3), or in any other suitable device. Embodiments are not limited to any particular storage method. It should also be highlighted that the specific sequence of the steps of the method shown in FIG. 6 and of the other methods described in this disclosure are not limited to any particular order. The steps are optionally implemented in any order.

At block 612, the waveforms having the same or approximately the same actual cross-track position are grouped together to form bins. For example, for illustration purposes only and not by limitation, waveforms having positions from +0.95% to +1.05% may be grouped together to form the bin for the 1% position. The actual size of the distribution about bin centers is illustratively selectable to be any size. It should be noted that this process may exclude some waveforms from being included within any bin. For instance, in an embodiment having bins at 0%, +/−1%, and +/−2%, a waveform having an actual position of 1.5% may be too far from both the 1% and 2% bins and will not be included in any bin.

At block 614, the waveforms within each bin are averaged together to generate an average waveform for each bin. Due to the tagging of the waveforms with their actual positions and the subsequent exclusion of waveforms that are not sufficiently close to a bin, the average waveform for any position may be a relatively accurate representation of the true waveform at the position. This is due of course to the fact that waveforms that are too far from the bin position not being included within the average. Illustrative examples of average waveform bins are shown by squares 501 in FIG. 5.

As was previously discussed, electronic noise included within each waveform is illustratively random. Accordingly, as multiple waveforms having the same signal but different random noise components are averaged together, the random noise components cancel each other out, and thus the remaining waveform is essentially the waveform with the electronic noise component removed. This is also shown in FIG. 5. FIG. 5 shows that the signal-to-noise averages for the bins 501, which are represented by the locations of the squares on the graph, are essentially on curve 508 that represents cross-track signal-to-noise ratios without electronic noise. Also as can be seen in the figure, the signal-to-noise ratio for each position across the width of the track is improved over the signal-to-noise ratio for any individual track read, which is represented by curve 504 showing cross-track signal-to-noise ratios that include electronic noise.

At block 616, the bin having the highest signal-to-noise ratio is identified. Embodiments are not limited to any particular method of accomplishing this identification. Methods optionally include comparing and analyzing the waveforms at the different positions/bins, and attempting to recover the data represented by the waveforms.

At block 618, the waveform for the bin having the highest signal-to-noise ratio is utilized to recover the data for the track. In the example shown in FIG. 5, the nominal read center, represented in the graph as dashed line 512, and the actual track center, represented in the graph as dashed line 514, are more or less aligned. This however need not be the case. In fact, some embodiments may be more useful in situations in which the nominal read center and the actual track center are misaligned. This may occur for instance if either the recording head writing components or the reading components are not properly positioned before they begin their respective writing or reading.

When the read center and the actual center are misaligned, the method shown in FIG. 6 illustratively helps to prevent waveforms that are offset from the true track center, and thus having lower signal-to-noise ratios, being used in data recovery. Instead, the method helps to ensure that a waveform that at least approximately corresponds to the track center is used to recover the data. This may be beneficial over other methods. For instance, an alternative method of forming an average waveform could include averaging the waveforms from multiple different cross-track positions. Such a method could include data from the track center, but would also include data offset from the center. This inclusion of offset data would dilute the center signal and lower the signal-to-noise ratio. The method shown in FIG. 6 avoids this problem. By identifying the track center, the bins corresponding to positions offset from the center are also identified, and are optionally excluded from being utilized in data recovery.

Embodiments of the present disclosure are not however limited to only using the waveform from one bin or track position in recovering data. In another embodiment, the waveforms for multiple bins or track positions are combined or aggregated together to form the waveform that is utilized in data recovery. In one embodiment, the aggregate waveform, $W_{aggregate}$, is calculated by the following equation:

$$W_{aggregate} = \sum_{i=i_{min}}^{i_{max}} K_i \cdot W_i \quad \text{Equation 1}$$

In which $W_i$ is the average waveform at the bin with the track center offset position $O_i$ with i going from its minimum value to its maximum value, and wherein $K_i$ is a coefficient applied to the waveform at each bin. The above equation is alternatively expressed as:

$$W_{aggregate} = K_1 \cdot W_1 + K_2 \cdot W_2 + K_3 \cdot W_3 + \quad \text{Equation 2}$$

In which again the K's represent coefficients applied to their respective waveforms and the W's represent the waveforms at each bin.

In one embodiment, an aggregate waveform improves read sensitivity by filtering out interference from adjacent tracks. As was previously mentioned, adjacent track interference is at its lowest value at the center of the track, which is furthest from the adjacent tracks. In light of this, in one embodiment, coefficients for off center waveforms are scaled to values that are less than one and are subtracted from the track center waveform. For instance, adjacent track interference at the track center may only be 30% of what it is at two off center locations. In such a situation, the off center waveforms are multiplied by 30% and are subtracted from the track center waveform. This illustratively removes the adjacent track interference from the center waveform and may help to improve the signal-to-noise ratio, and thus help to improve data recovery.

Figure 7:
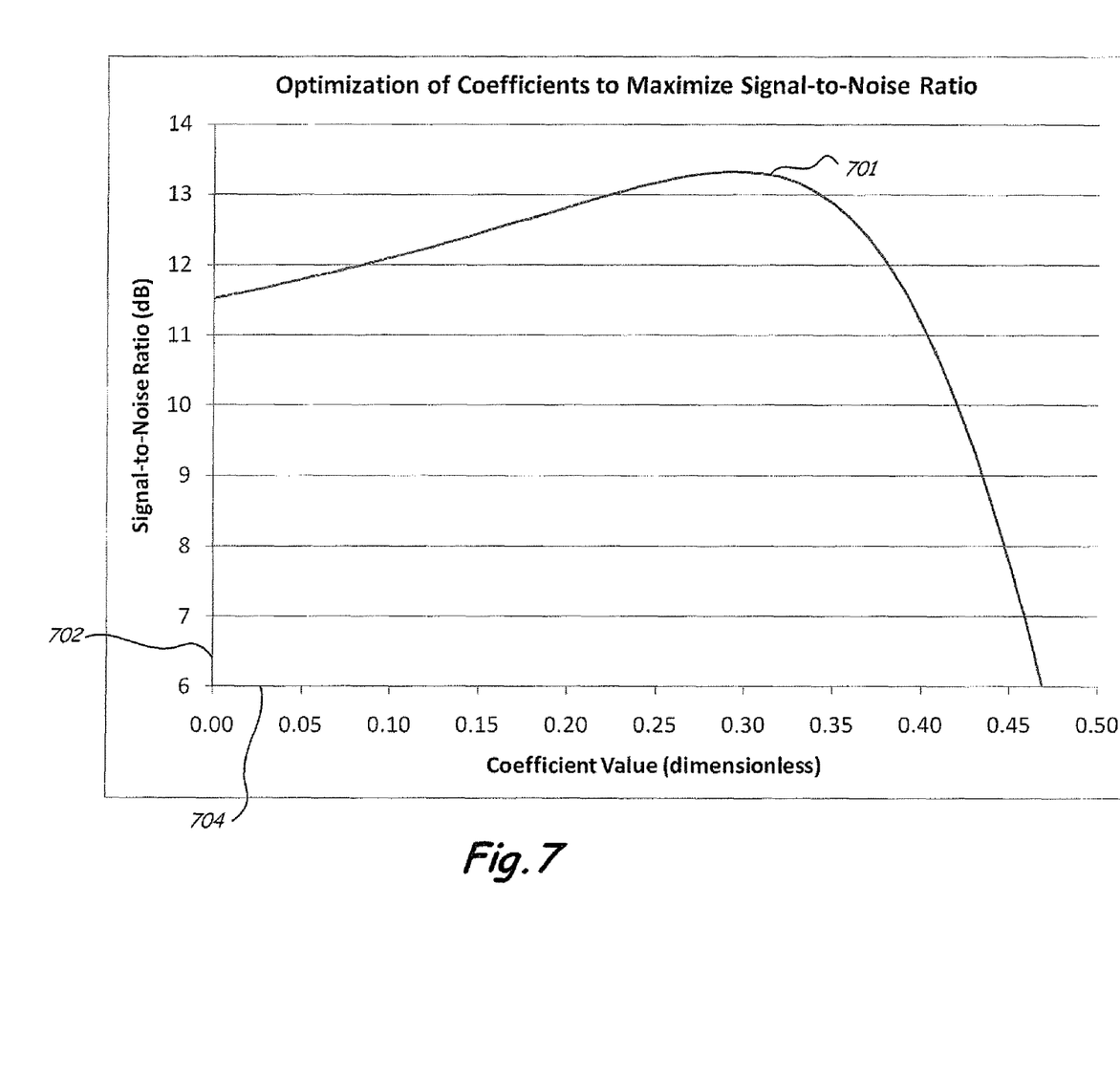
FIG. 7 is a graph illustrating optimization of coefficients applied to off center waveforms.

FIG. 7 shows one example of signal-to-noise ratios 701 as a function of the coefficients applied to the off center waveforms. Embodiments of the present disclosure are not however limited to any particular coefficients, and the example shown in the figure is for illustration purposes only. In the case shown in the figure, two off center waveforms that are each 15% of the track pitch away from the center are being subtracted from the center waveform. The Y-axis 702 represents the signal-to-noise ratios, and the X-axis 704 represents the coefficients applied to the off center waveforms. As can be seen in the graph, when the coefficients are 0.00, the signal-to-noise ratio is approximately 11.5. That point corresponds to the off center waveforms being given no weight, or in other words, it corresponds to just the signal-to-noise ratio of the center waveform by itself. Next, as the coefficients are increased (i.e. the off center waveforms are given some weight), the signal-to-noise ratios improve up until approximately the point of the coefficients being 0.30 or 30%. Accordingly, the graph shows that in at least certain situations that utilizing off center waveforms can improve the signal-to-noise ratio over just selecting the center waveform. Finally, as the coefficients are increased past 0.30 or 30%, the signal-to-noise ratios begin to decrease. In certain situations, the off center waveforms will include part of the track signal that is attempting to be read. Thus, if too much of the off center waveforms are subtracted from the center waveform, the signal-to-noise ratio will decrease because the signal is being lost as well as noise being removed.

Figure 8:
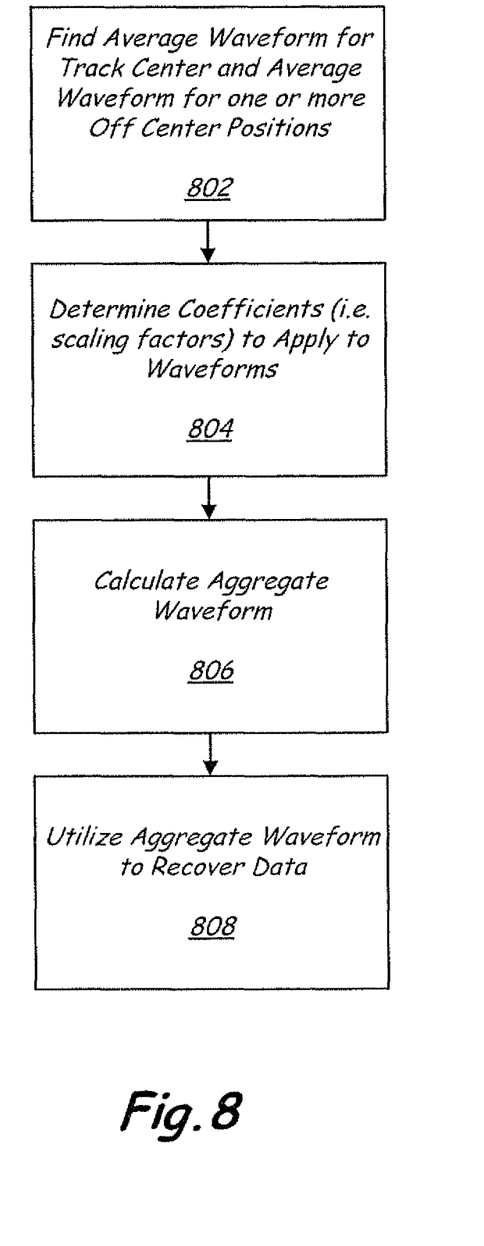
FIG. 8 is a flow diagram of a method of utilizing an aggregate waveform to recover data written to a data track.

FIG. 8 is a flow diagram of one method of utilizing an aggregate waveform to recover data. At block 802, average waveforms or bins for the track center and for one or more off center positions are determined. The average waveforms are illustratively determined according to the method shown in FIG. 6. Embodiments are not however limited to any particular method of determining average waveforms.

At block 804, coefficients or scaling factors to be applied to the waveforms are determined. The coefficient for the center waveform is illustratively 1, and the coefficients for the off center waveforms are illustratively between 0 and 1. The values are optionally chosen to maximize the signal-to-noise ratio such as is shown in FIG. 7.

At block 806, the aggregate waveform is calculated. It is illustratively calculated utilizing equations 1 or 2 above. For instance, in one embodiment for illustration purposes only and not by limitation, the center waveform is multiplied by 1, and the off center waveforms are multiplied by a value between 0 and 1 and are subtracted from the center waveform. Then, at block 808, the aggregate waveform is utilized to recover the data stored in the data track.

It is worthwhile to highlight at least a few of the potential advantages of some of the embodiments described above. Certain embodiments identify the track center, remove electronic noise by averaging multiple waveforms together, and/or remove adjacent track interference by utilizing off center waveforms to generate an aggregate waveform. As has been described above, each of these features may independently help to improve the signal-to-noise ratio and may thus improve recovering data stored in a track. For instance, identifying the track center may be helpful to ensure that waveforms at the center of the track and not waveforms from off center are being used in data recovery. Additionally, the features described above are illustratively also used in combination with each other. In such a situation, the combination or cumulative effects of the features may further improve the signal-to-noise ratio and improve the likelihood of recovering the data stored in the track.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. A method comprising:
reading a data track at a first position along a width of the data track;
reading the data track at a second position along the width of the data track, the first and the second positions being predetermined positions corresponding to different physical locations along the width of the data track, and the first and the second positions being at a substantially same location along a length of the data track;
storing data read from the data track; and
tagging the stored data with indications of the first and the second positions.

2. The method of claim 1, further comprising:
utilizing the stored data and the indications of the first and the second positions to calculate an average waveform for each of the first and the second positions.

3. The method of claim 2, further comprising:
identifying the average waveform having the highest signal-to-noise ratio.

4. The method of claim 3, further comprising:
recovering data stored in the data track utilizing the average waveform having the highest signal-to-noise ratio.

5. The method of claim 2, further comprising:
calculating a first coefficient and a second coefficient;
applying the first coefficient to the average waveform for the first position;
applying the second coefficient to the average waveform for the second position; and
combining the average waveforms to form an aggregate waveform for the data track.

6. The method of claim 5, wherein one of the first and the second coefficients is between 0 and 1.

7. The method of claim 5, wherein one of the first and the second coefficients is 1.

8. The method of claim 5, wherein combining the average waveforms comprises subtracting one of the average waveforms from the other one of the average waveforms.

9. A method comprising:
reading a data track at multiple locations along a width of the data track, the multiple locations along the width of the data track being substantially co-located along a length of the data track; and
calculating an average waveform for each of the multiple locations.

10. The method of claim 9, further comprising:
generating an aggregate waveform for the data track utilizing the average waveform for each of the multiple locations.

11. The method of claim 10, wherein the aggregate waveform is generated utilizing the equation:

$$W_{aggregate} = \sum_{i=i_{min}}^{i_{max}} K_i \cdot W_i$$

in which $K_i$ represents coefficients applied to each of the average waveforms $W_i$.

12. The method of claim 10, further comprising:

associating data read from the data track with indications of the multiple locations.

13. The method of claim 12, further comprising:

utilizing the indications of the multiple locations to generate bins.

14. The method of claim 9, wherein one of the multiple locations is a center of the data track and another one of the multiple locations is an off center position.

15. The method of claim 14, further comprising:

removing adjacent track interference noise by subtracting the average waveform for the off center position from the average waveform for the center of the data track.

16. A data storage system comprising:

a recording medium having data tracks, each of the data tracks having a width that runs between an inner diameter of the recording medium and an outer diameter of the recording medium; and a processing unit configured to store different waveforms for each of the data tracks into a memory unit, the processing unit configured to store, for each of the different waveforms for at least one of the data tracks, information indicative of a different associated position along the width of the data track, the different associated positions along the width of the data track being in about a same relative instantaneous position along a length of the data track.

17. The data storage system of claim 16, wherein the information indicative of the associated positions includes information indicative of a center position.

18. The data storage system of claim 16, wherein the information indicative of the associated positions includes information indicative of an off center position.

19. The data storage system of claim 16, wherein the processing unit is configured to calculate average waveforms for the data tracks.

20. The data storage system of claim 19, wherein the processing unit is further configured to calculate aggregate waveforms for the data tracks.

* * * * *